J. W. JOHNSON.
DISPENSING APPARATUS.
APPLICATION FILED SEPT. 11, 1915.

1,201,970.

Patented Oct. 17, 1916.
3 SHEETS—SHEET 1.

J. W. Johnson, Inventor,
by C. A. Snow & Co.
Attorneys

Witnesses

J. W. JOHNSON.
DISPENSING APPARATUS.
APPLICATION FILED SEPT. 11, 1915.

1,201,970.

Patented Oct. 17, 1916.
3 SHEETS—SHEET 3.

J. W. Johnson
Inventor,

Witnesses by C. A. Snow & Co.
Attorneys.

UNITED STATES PATENT OFFICE.

JOHN W. JOHNSON, OF BLUEFIELD, WEST VIRGINIA.

DISPENSING APPARATUS.

1,201,970.  Specification of Letters Patent.  Patented Oct. 17, 1916.

Application filed September 11, 1915. Serial No. 50,165.

*To all whom it may concern:*

Be it known that I, JOHN W. JOHNSON, a citizen of the United States, residing at Bluefield, in the county of Mercer and State of West Virginia, have invented a new and useful Dispensing Apparatus, of which the following is a specification.

This invention relates to check controlled apparatus especially designed for use in dispensing gasolene, although it is to be understood that the same can be employed for the purpose of dispensing any other liquid desired.

One of the objects of the invention is to provide apparatus of this character which can be left at a point where it is easily accessible to the public but which will not become effective until a coin of predetermined denomination has been inserted into the apparatus, whereupon certain mechanism will be set into operation to lift liquid into a measuring tank, after which the said liquid will be automatically discharged from the tank and into the receptacle provided therefor by the customer. For example, a hose can be extended from the measuring tank to the fuel tank of an automobile and after a coin of proper denomination has been placed in the apparatus, liquid can be hoisted to the measuring compartment and after a predetermined amount has been measured, the motor will become ineffective and the liquid will be permitted to gravitate from the measuring tank and through the hose.

A further object is to provide means whereby the stopping of the flow of liquid to the measuring tank can be accomplished automatically when the amount of liquid in the measuring tank is equal in value to the deposited coin, it being possible to adjust the apparatus so that the amount of liquid in the apparatus will vary to correspond with any fluctuations in the price of the material.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

Figure 1:
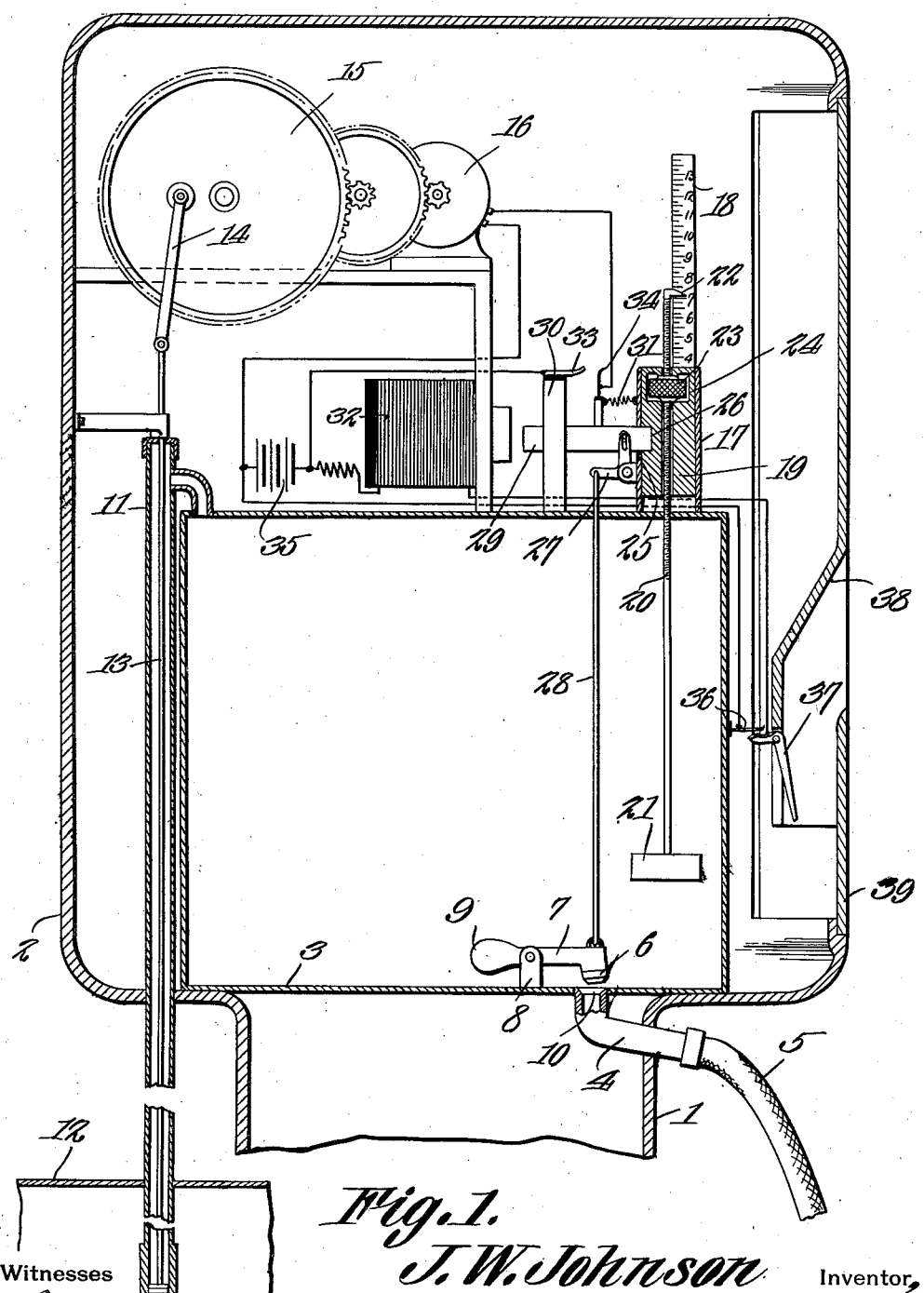
Figure 2:
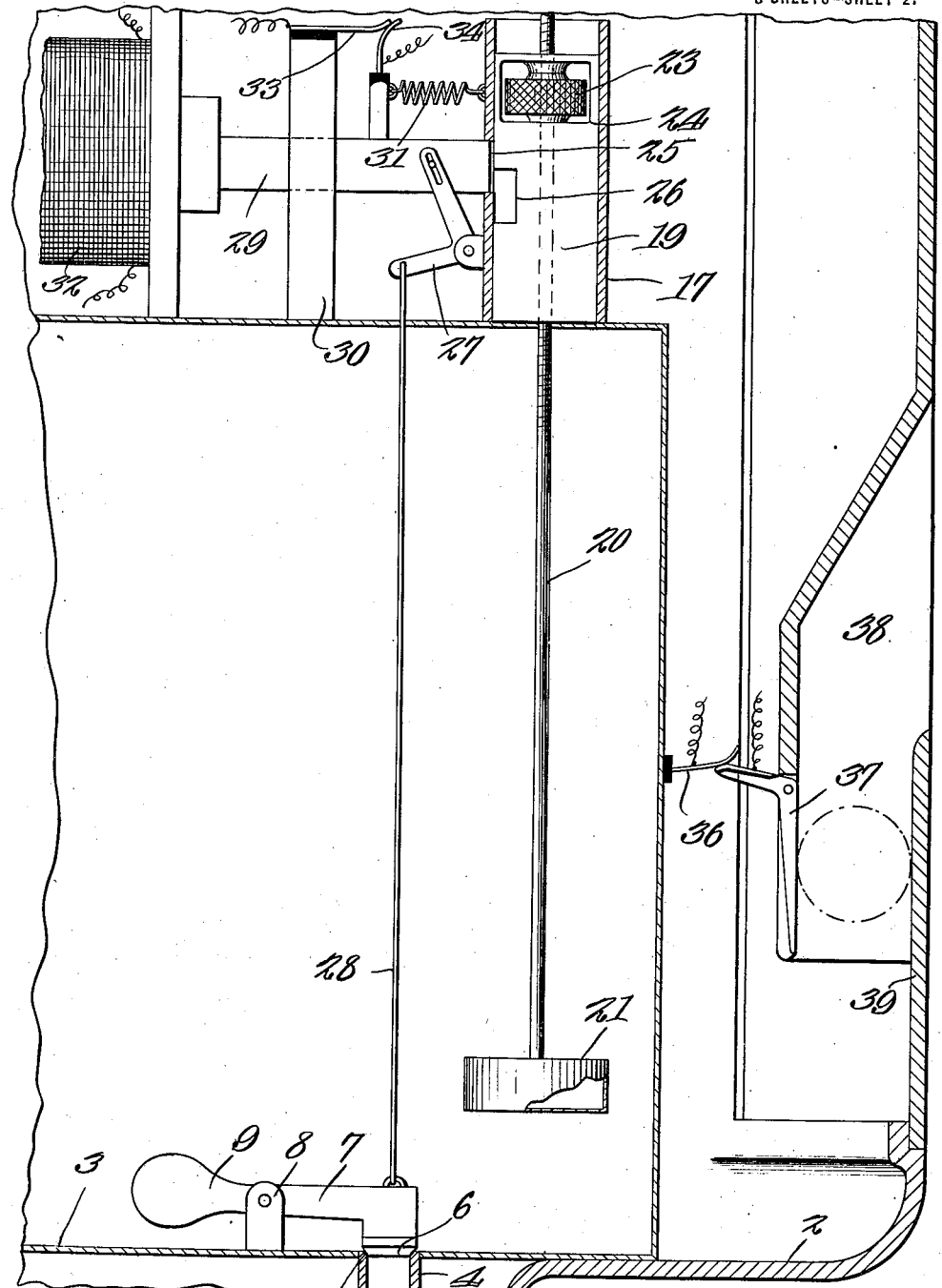
Figure 3:
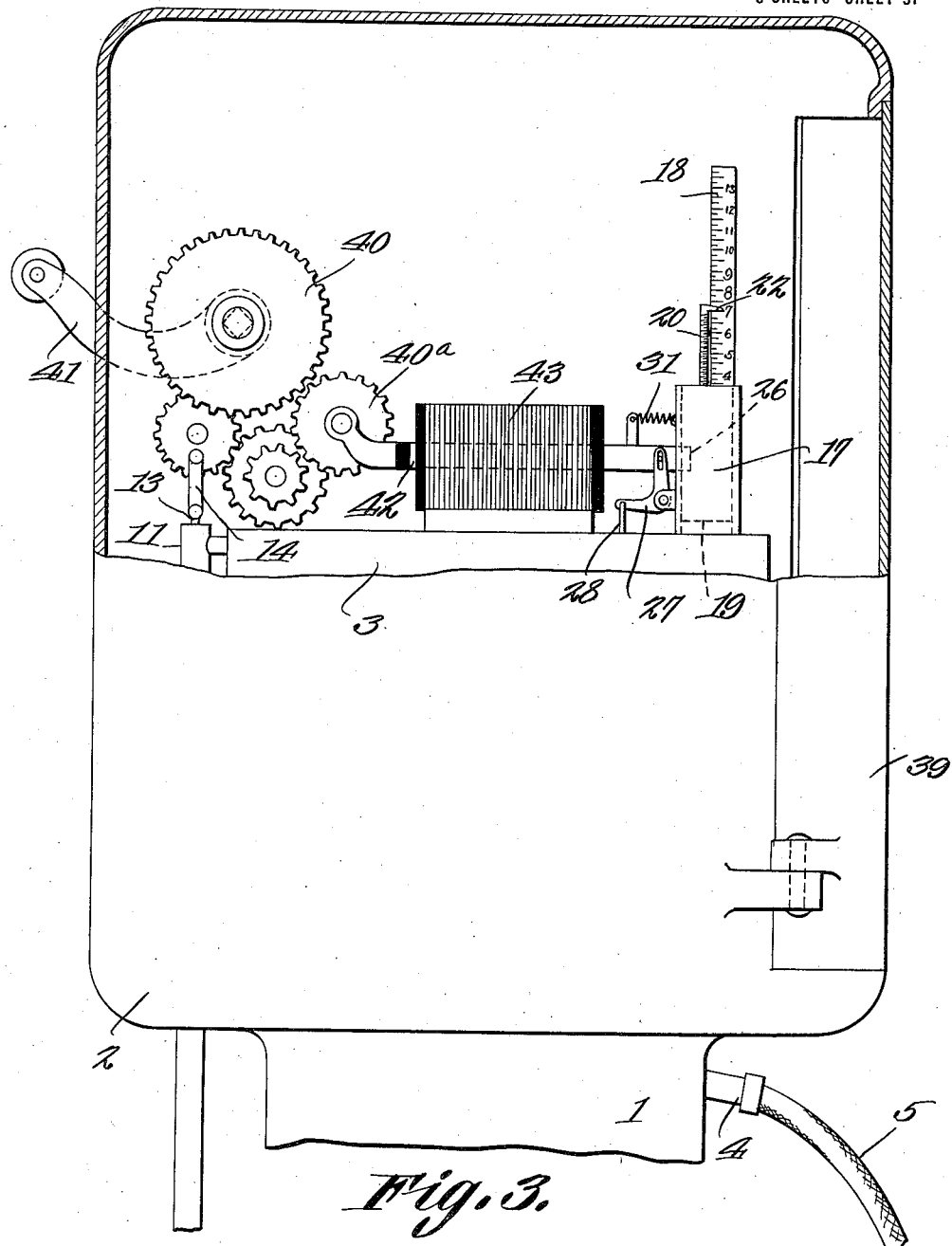

In said drawings:—Figure 1 is a vertical section through the apparatus showing the parts in their normal positions. Fig. 2 is an enlarged section through a portion of the mechanism showing the parts in the positions assumed thereby while a coin is being deposited. Fig. 3 is a view partly in section and partly in elevation showing a modified form of apparatus.

Referring to the figures by characters of reference 1 designates a portion of a pedestal having a casing 2 at the upper end thereof in which is arranged a measuring tank 3. This measuring tank has an outlet spout 4 from which a hose 5 extends and a valve 6 is arranged adjacent one end of the spout 4 and is carried by an arm 7 pivotally mounted on a bracket 8, said arm having a weight 9 whereby the same is counterbalanced. A seat 10 is provided at the upper end of the spout 4 for the valve 6.

Opening into the top portion of the measuring tank 3 is a pump 11 of any preferred construction and which extends into a storage tank 12 preferably located underground at any desired point relative to the pedestal 1. The pump rod 13 is adapted to be operated by a pitman 14 receiving motion from one of a train of gears 15 driven by an electric motor 16.

Upstanding from the measuring tank 3 is a guide 17 having an upstanding graduated arm 18. A block 19 is slidably mounted in the guide and extending through this block is a rod 20 to the lower end of which is secured a float 21 suspended within the measuring tank. Rod 20 extends entirely through the block 19 and its upper end is provided with an index or pointer 22 which coöperates with the graduated arm 18 to indicate units of measure or fractions thereof. That portion of rod 20 within the slide 19 is screw threaded and is engaged by an adjusting nut 23 seated within a transverse opening 24 in the slide 19. By means of this nut the rod 20 can be adjusted longitudinally relative to the slide 19 so as to cause the index 22 to designate a predetermined graduation. The graduations on the arm 18 can indicate quarts or other units of measure. Guide 17 has an opening 25 and a recess 26 is formed in the slide 19. This recess is adapted to register with the opening 25 when the slide 19 is raised a short distance from the top of the measuring tank 3.

Mounted on the guide 17 is a bell crank lever 27 one arm of which is connected by a rod 28 to the arm 7 carrying valve 6, while the other arm of the bell crank lever is slidably and pivotally connected to a bolt 29 one end portion of which is mounted in the opening 25, while the other end portion is supported by a guide 30. When slide 19 is in its raised position, this bolt 29 will be extended into the recess 26 so as to support the slide, a spring 31 being employed for holding the bolt normally in this position. An electromagnet 32 is arranged adjacent one end of bolt 29 and is adapted, when energized, to attract the bolt 29 to withdraw it from the recess 26.

A contact 33 is carried by the guide 30 and another contact 34 is carried by the bolt 29. These contacts are electrically connected to the motor 16 and to a source of energy indicated generally at 35. The electromagnet 32 is electrically connected to the source of energy 35 and to a contact 36 and a lever 37. Lever 37 is mounted in a coin chute 38 and one arm of the lever is extended downwardly within the chute so that, when a coin of proper denomination is inserted into the coin chute and permitted to gravitate therealong, it will press against the depending arm of lever 37 and swing it laterally with the result that the other arm of said lever will engage contact 36 and thus complete a circuit through the magnet 32. Under normal conditions, however, lever 37 is removed from the contact 36 and, as will be obvious, the contacts 33 and 34 are likewise separated.

Assuming that the storage tank 12 contains a supply of gasolene and that eight gallons of gasolene are to be sold for one dollar, then the merchant opens the casing 2 and, by rotating the nut 23, adjusts the rod 20 longitudinally relative to the slide 19 until the index 22 designates the graduation "8", designating eight gallons. It might be stated that access to the interior of the casing 2 can be had by providing a door 39 carrying the coin chute 38. After this adjustment of the float 21 and rod 20 has been effected, the door can be closed and locked and the apparatus is then ready for use. A customer desiring to purchase a supply of gasolene, places the hose 5 into the fuel tank of the automobile or into the other receptacle provided and then inserts a silver dollar into the chute 38. The coin in passing downwardly within the chute will shift lever 37 so as to close the circuit through the lever 37 and contact 36 and the magnet 32, with the result that the bolt 29 will be attracted to the magnet and will be withdrawn from recess 26. Consequently slide 19 will drop a short distance so as to bring recess 26 out of register with opening 25 and the bolt 29 will thus be prevented from returning to its normal position after the contact has been broken by lever 37 returning to its original position. The retraction of bolt 29 will result in lever 27 thrusting downwardly through rod 28 against arm 7 and causing valve 6 to close upon its seat 10, thus sealing the inlet to the spout 4. Simultaneously with the retraction of bolt 29, contact 34 moves against contact 33 and remains in such position as long as the bolt is retracted. This engagement of the two contacts 34 and 33 completes the circuit to the motor 16 with the result that the pump is set in operation and gasolene is lifted from the storage tank 12 to the measuring tank 3. As the level of the gasolene rises in the measuring tank, the float 21 will ultimately be caused to move upwardly, carrying the slide 19 therewith until recess 26 is brought into line with bolt 29, whereupon spring 31 will shoot the bolt into the recess 26. This operation will result in breaking the circuit to the motor and in lifting valve 6 from its seat. Thus the liquid contents of the measuring tank 3 will be free to gravitate through spout 4 and hose 5 into the receptacle provided therefor.

It is to be understood that various modifications of the structure can be made. For example, in Fig. 3, instead of utilizing an electric motor for operating the pump, a train of gears 40 operated by a crank arm 41 or in any other suitable manner, may be employed. One of the gears 40$^a$ of the train can be carried by the armature 42 of a solenoid 43, one end of this armature constituting a bolt adapted to engage the slide in guide 17. It will be seen that when the magnet 43 is energized by the depositing of a coin in the coin chute in the manner hereinbefore pointed out, the armature 43 will be shifted longitudinally so as to become disengaged from the slide in guide 17 and at the same time the gear 40$^a$ carried by the armature will be thrust into mesh with the adjoining gears of the train 40. Consequently by means of crank 41 motion can be transmitted to the pump as long as the slide in the guide 17 is in its lowermost position and the bolt portion of the armature 42 is retracted. When, however, the slide in the guide 17 is raised in the manner hereinbefore pointed out, and the bolt portion of armature 42 is restored to its original or locking position, gear 40$^a$ will be pulled out of mesh with the adjoining gears of the train 40 so that further rotation of crank 41 will not result in the actuation of the pump.

What is claimed is:

1. Liquid dispensing apparatus including a measuring tank having an outlet, a valve normally open, normally inactive means for feeding liquid into the tank, a float normally held in raised position, a single means for controlling the closing of the valve, rendering active the liquid feeding means and releasing the float, and means movable with the float for holding the valve and feeding means in said last named position until the float has been raised to its initial position by the entering liquid.

2. Liquid dispensing apparatus including a measuring tank having an outlet, a normally open valve for the outlet, normally inactive means for feeding liquid into the tank, a means for controlling the closing of the valve and rendering active the liquid feeding means, a slide for holding the valve and liquid feeding means in closed and active positions respectively, a float within the tank, and an adjustable connection between the float and the slide, said slide being movable with the float during the filling of the tank, to secure the float in its normal position, open the valve, and render the feeding means inactive.

3. Liquid dispensing apparatus including a measuring tank having an outlet, a normally open valve for the outlet, normally inactive means for feeding liquid into the tank, a means for controlling the closing of the valve and rendering active the liquid feeding means, a slide for holding the valve and liquid feeding means in closed and active positions respectively, a float within the tank, an adjustable connection between the float and the slide, said slide being movable with the float during the filling of the tank, to secure the float in its normal position, open the valve, and render the feeding means inactive, an index movable with the float, and a graduated means coöperating with the index.

4. Liquid dispensing apparatus including a measuring tank having an outlet, a normally open valve, normally inactive means for feeding liquid into the tank, an electromagnet, means for completing a circuit to the magnet, a slide, a member normally supporting the slide, said member being retracted by the energized magnet to release the slide, means operated by the movement of said member out of its normal position, for rendering active the liquid feeding means, means operated by the movement of said member out of its normal position for closing the valve, and a float within the tank and connected to the slide for raising the slide to its initial position during the rise of liquid within the tank, and means for automatically returning said member to its initial position when the slide is raised, thereby to open the valve to render the feeding means inactive.

5. Liquid dispensing apparatus including a measuring tank having an outlet, a normally open valve, normally inactive means for feeding liquid into the tank, an electromagnet, movable means for completing a circuit to the magnet, a slide, a member normally supporting the slide, said member being retracted by the energized magnet to release the slide, means operated by the movement of said member out of its normal position, for rendering active the liquid feeding means, means operated by the movement of said member out of its normal position for closing the valve, and an adjustable float within the tank and connected to the slide for raising the slide to its initial position during the rise of liquid within the tank, means for automatically returning said member to its initial position when the slide is raised, thereby to open the valve and to render the feeding means inactive, an index movable with the float, and a graduated member coöperating with the index.

In testimony that I claim the foregoing as my own, I have hereto affixed my signature in the presence of two witnesses.

JOHN W. JOHNSON.

Witnesses:
  Ivy E. Simpson,
  Philomena A. Roekeli.